United States Patent
Tu et al.

(10) Patent No.: US 11,582,573 B2
(45) Date of Patent: Feb. 14, 2023

(54) DISABLING/RE-ENABLING HEAD TRACKING FOR DISTRACTED USER OF SPATIAL AUDIO APPLICATION

(71) Applicant: Apple Inc., Cupertino, CA (US)

(72) Inventors: Xiaoyuan Tu, Sunnyvale, CA (US); Umamahesh Srinivas, Milpitas, CA (US); Seyyedeh Mahsa Mirzargar, Santa Clara, CA (US); Keyu Chen, San Ramon, CA (US); Alexander Singh Alvarado, San Jose, CA (US); Ronald K. Huang, San Jose, CA (US); Aditya Sarathy, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/484,653

(22) Filed: Sep. 24, 2021

(65) Prior Publication Data

US 2022/0103964 A1 Mar. 31, 2022

Related U.S. Application Data

(60) Provisional application No. 63/083,844, filed on Sep. 25, 2020.

(51) Int. Cl.
| | |
|---|---|
| *H04S 7/00* | (2006.01) |
| *H04S 1/00* | (2006.01) |
| *H04R 5/033* | (2006.01) |
| *H04W 4/80* | (2018.01) |
| *H04W 52/02* | (2009.01) |
| *H04B 1/3827* | (2015.01) |
| *H04R 1/10* | (2006.01) |

(52) U.S. Cl.
CPC ............. *H04S 7/304* (2013.01); *H04B 1/385* (2013.01); *H04R 1/1041* (2013.01); *H04R 5/0335* (2013.01); *H04S 1/005* (2013.01); *H04W 4/80* (2018.02); *H04W 52/0254* (2013.01); *H04B 2001/3866* (2013.01); *H04R 2420/07* (2013.01)

(58) Field of Classification Search
CPC .......... H04S 7/304; H04S 1/005; H04W 4/80; H04W 52/0254; H04B 1/385; H04R 1/1041; H04R 5/0335
See application file for complete search history.

(56) References Cited

U.S. PATENT DOCUMENTS

| | | | |
|---|---|---|---|
| 9,459,692 B1 | 10/2016 | Li | |
| 10,339,078 B2 * | 7/2019 | Nair | ...................... G06F 1/3203 |
| 2005/0281410 A1 | 12/2005 | Grosvenor et al. | |

(Continued)

*Primary Examiner* — David Bilodeau
(74) *Attorney, Agent, or Firm* — Fish & Richardson P.C.

(57) ABSTRACT

Embodiments are disclosed for disabling/re-enabling head tracking for spatial audio applications. In an embodiment, a method comprises: obtaining, using one or more processors of an auxiliary device worn by a user, motion data; tracking, using the one or more processors, the user's head based at least in part on the motion data; determining, using the one or more processors, whether or not the user is walking based at least in part on the motion data; in accordance with determining that the user is walking, determining if a source device configured to deliver spatial audio to the auxiliary device is static for a specified period of time; and in accordance with determining that the user is walking and the source device is static for the specified period of time, disabling the head tracking.

20 Claims, 11 Drawing Sheets

(56) References Cited

U.S. PATENT DOCUMENTS

| | | |
|---|---|---|
| 2014/0153751 A1 | 6/2014 | Wells |
| 2016/0119731 A1* | 4/2016 | Lester, III ................. H04S 7/40 |
| | | 381/59 |
| 2016/0269849 A1* | 9/2016 | Riggs ..................... H04R 29/00 |
| 2017/0295446 A1 | 10/2017 | Thagadur Shivappa |
| 2018/0091923 A1 | 3/2018 | Satongar et al. |
| 2018/0220253 A1* | 8/2018 | Kärkkäinen ........... H04R 5/033 |
| 2019/0313201 A1 | 10/2019 | Torres et al. |
| 2019/0379995 A1 | 12/2019 | Lee et al. |
| 2020/0037097 A1 | 1/2020 | Torres et al. |
| 2020/0059749 A1* | 2/2020 | Casimiro Ericsson ...................... |
| | | G06F 3/017 |
| 2020/0169828 A1 | 5/2020 | Liu et al. |
| 2021/0211825 A1 | 7/2021 | Joyner et al. |
| 2021/0396779 A1 | 12/2021 | Sarathy et al. |
| 2021/0397249 A1 | 12/2021 | Kriminger et al. |
| 2021/0397250 A1 | 12/2021 | Akgul et al. |
| 2021/0400414 A1 | 12/2021 | Tu et al. |
| 2021/0400418 A1 | 12/2021 | Tam et al. |
| 2021/0400419 A1 | 12/2021 | Turgut et al. |
| 2021/0400420 A1 | 12/2021 | Tam et al. |
| 2022/0103965 A1 | 3/2022 | Tu et al. |

* cited by examiner though watching a movie, playing a video game or interacting with augmented reality (AR) content on a source device (e.g., a computer screen). Existing spatial audio platforms include a head tracker that uses a video camera to track the head of a user and provide the user a visual anchor to the source device. If the source device is a mobile device (e.g., smartphone, tablet computer), then the source device and the headset are free to move relative to each other, which may adversely impact the user's perception of the 3D spatial audio. In some scenarios, the user may become temporarily distracted and walk away from the source device causing the user to lose their visual anchor to the source device.

DISABLING/RE-ENABLING HEAD TRACKING FOR DISTRACTED USER OF SPATIAL AUDIO APPLICATION

CROSS-REFERENCE TO RELATED APPLICATION

This application claims priority to U.S. Provisional Patent Application No. 63/083,844, filed Sep. 25, 2020, the entire contents of which are incorporated herein by reference.

TECHNICAL FIELD

This disclosure relates generally to head tracking for spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content on a source device (e.g., a computer screen). Existing spatial audio platforms include a head tracker that uses a video camera to track the head of a user and provide the user a visual anchor to the source device. If the source device is a mobile device (e.g., smartphone, tablet computer), then the source device and the headset are free to move relative to each other, which may adversely impact the user's perception of the 3D spatial audio. In some scenarios, the user may become temporarily distracted and walk away from the source device causing the user to lose their visual anchor to the source device.

SUMMARY

Embodiments are disclosed for disabling/re-enabling head tracking for spatial audio applications.

In an embodiment, a method comprises: obtaining, using one or more processors of an auxiliary device worn by a user, motion data; tracking, using the one or more processors, the user's head based at least in part on the motion data; determining, using the one or more processors, whether or not the user is walking based at least in part on the motion data; in accordance with determining that the user is walking, determining if a source device configured to deliver spatial audio to the auxiliary device is static for a specified period of time; and in accordance with determining that the user is walking and the source device is static for the specified period of time, disabling the head tracking.

In an embodiment, the method further comprises: receiving, using a wireless transceiver of the auxiliary device, a radio frequency signal from the source device; determining, using the one or more processors, that a strength of the radio frequency (RF) signal has decreased by a specified amount; and in accordance with determining that the user is walking, the source device is static for the specified period of time and the strength of the RF signal has decreased by a specified amount, disabling the head tracking.

In an embodiment, the strength of the RF signal is indicated by a received signal strength indicator (RSSI) computed from the signal strength of the received RF signal.

In an embodiment, determining whether or not the user is walking based at least in part on the motion data, further comprises: converting the motion data into a frequency spectrum; determining, based on one or more features of the frequency spectrum, whether or not a foot-strike has occurred that is indicative of walking; determining a roll angle from the motion data in a face reference frame; determining a pitch angle from the motion data in the face reference frame; determining whether or not the roll angle and the pitch angle are within expected ranges for walking; and in accordance with determining that the one or more features of the frequency spectrum indicate a foot-strike and side sway and the roll and pitch angles are within their expected ranges for walking, determining that the user is walking.

In an embodiment, determining, based on one or more features of the frequency spectrum, whether not a foot-strike has occurred that is indicative of walking, further comprises: converting the motion data into a vertical plane and a horizontal plane in an inertial reference frame; computing a first frequency spectrum of the vertical motion; computing a second frequency spectrum of the horizontal motion; determining a peak energy in the first frequency spectrum; determining a first portion of energy in the first frequency spectrum and a second portion of the energy in the second frequency spectrum; and determining a presence of a foot-strike at each step of the user and side sway at each step to step based on the peak energy exceeding a specified threshold and a ratio of the first portion of energy and the second portion of energy.

In an embodiment, the method further comprises determining that the motion data is missing samples, and interpolating the motion data to generate additional motion data.

In an embodiment, the motion data includes acceleration data and rotation rate data, and interpolating the motion data to generate additional motion data, further comprises: buffering a specified number of motion data samples in a buffer; identifying a gap in the buffered motion data samples; determining whether or not the gap is less than a specified amount of time or data rate; in accordance with the gap being less than the specified amount of time or data rate, interpolating the buffered motion data samples to a higher number of motion data samples; for acceleration data in the motion data samples, zero padding the acceleration data, generating a frequency spectrum from the zero padded acceleration data, extracting one or more features from the frequency spectrum that indicate a foot-strike or side sway, and determining that the user is walking based at least in part on the extracted one or more features; and for rotation rate data in the motion data samples, integrating the rotation rate data over the higher number of rotation rate samples to obtain roll and pitch angles, and determining that the user is walking at least in part based on the roll and pitch angles being within an expected range for walking.

In an embodiment, the motion data is acceleration and rotation rate in a body reference frame of the auxiliary device.

In an embodiment, determining whether or not the user is walking based at least in part on the motion data is computed every X seconds with an Y % overlap window, where X and Y are integers or real numbers greater than zero.

In an embodiment, N consecutive determinations that the user is walking are made before disabling the headset, where N is an integer greater than one.

In an embodiment, a method comprises: disabling, using one or more processors of an auxiliary device worn by a user, head tracking for a spatial audio application, where a source device is presenting at least spatial audio content to the user through the auxiliary device; detecting, using the one or more processors, a touch input on a display screen of the source device; or determining, using the one or more processors, that the auxiliary device is static; or determining, using the one or more processors, that the source device is moving; or determining, using the one or more processors, that the user is walking back to the source device; and in accordance with detecting touch input on the display screen of the source device or determining that the auxiliary device is static or that the source device is moving or the user is walking back to the source device, re-enabling, using the one or more processors, head tracking for the spatial audio application.

In an embodiment, the method further comprises: obtaining, using the one or more processors, data from another auxiliary device worn by the user, transition data indicating a sit-to-stand transition or stand-to-sit transition; and in accordance with determining that the user is walking, the source device is static for the specified period of time and the transition data, disabling the head tracking.

Other embodiments can include a system, apparatus, computing device and non-transitory, computer-readable storage medium.

Particular embodiments disclosed herein provide one or more of the following advantages. Head tracking for spatial audio applications is disabled when a user walks away from a source device from which she is consuming audio/visual content, and re-enabled when the user walks back to the device and resumes consuming the audio/visual content, thus avoiding the user perceiving spatial audio as no longer anchored to the source device, which can be disorientating and annoying to the user.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1A:
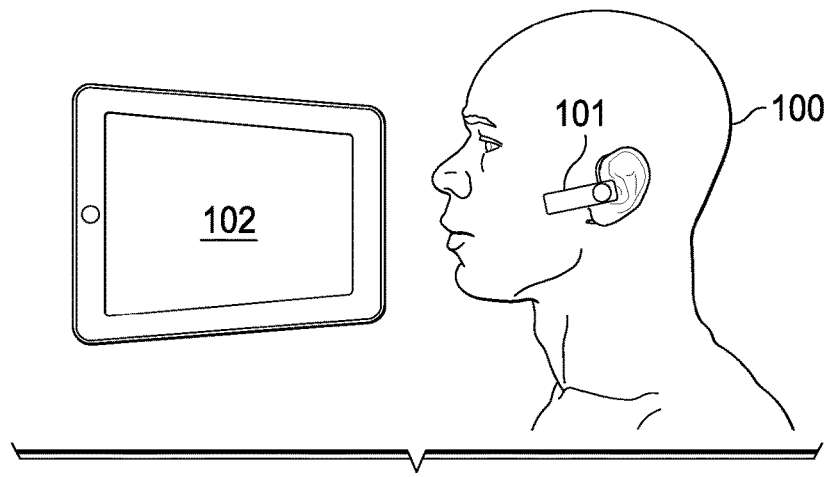
FIG. 1A illustrates a spatial audio application, according to an embodiment.

FIG. 1A illustrates a spatial audio application, according to an embodiment. In the example scenario shown, user 100 is wearing headset 101 while watching audio/visual (A/V) content on source device 102. A/V content can include but is not limited to: movies, television shown, conference calls, video game, augmented reality (AR) applications, virtual reality (VR) applications and any other content that utilizes spatial or immersive audio. Headset 101 includes any type of audio output device that is worn by the user, including on-ear, in-ear and over-ear headphones, earbuds, earphones, Bluetooth headphones, Airpods®, VR or AR headsets and any other audio output device that is capable of producing spatial audio.

Source device 102 is any device capable of presenting any type of A/V content or only spatial audio content, including but not limited to: a smartphone, tablet computer, notebook computer, wearable computer, table computer, surface tablet, etc. A spatial audio application is an application that runs on source device 102 and generates surround sound or 3D audio through headset 101.

Figure 1B:
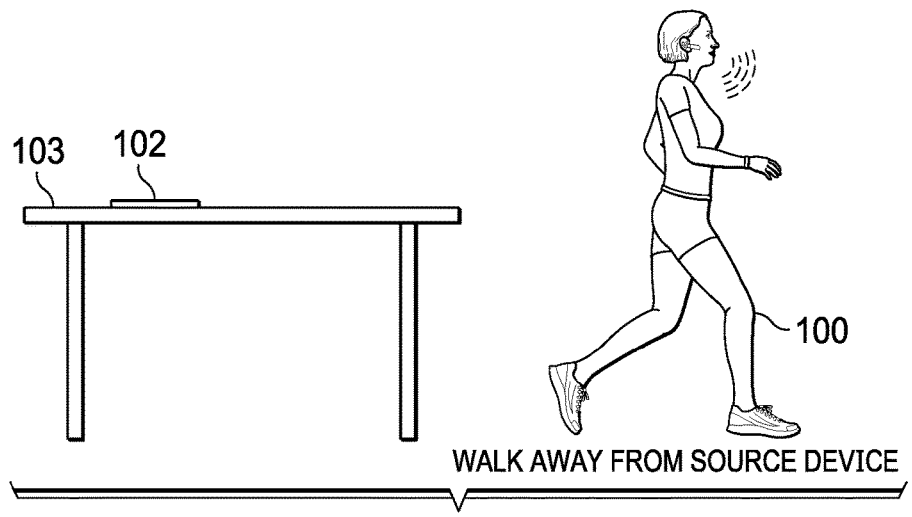
FIG. 1B illustrates a scenario where the user walks away from a source device, according to an embodiment.

FIG. 1B illustrates a scenario where the user walks away from a source device, according to an embodiment. In this example scenario, user 100 is watching content presented by source device 102 and then decides to walk away from source device 102 leaving source device 102 (e.g., a tablet computer) on table 103. This scenario would happen if user 100 decides to get something to eat in their kitchen, visit their bathroom, etc. When the user walks away from source device 102 the user will lose their visual anchor with source device 102, which will cause their perception of the spatial audio to be disorientating. It is therefore desirable to disable head tracking whenever user 100 walks away from source device 102. To prevent disabling of head tracking unnecessarily it is important to accurately determine when user 100 has walked away from source device 102.

Figure 1C:
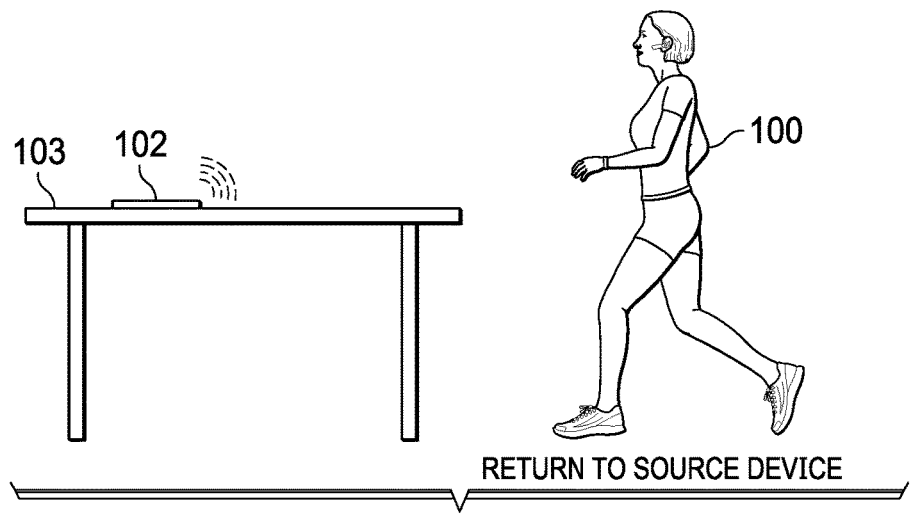
FIG. 1C illustrates a scenario where the user walks back to the source device, according to an embodiment.

FIG. 1C illustrates a scenario where the user walks back to the source device, according to an embodiment. In this example scenario, head tracking was disabled when user 100 walked away from source device 102, but is now walking back to source device 102 to resume consuming content presented by source device 102. In this case, it is desirable to accurately recognized when the user is walking back to source device 102 to re-enable head tracking. For example, user 101 can be walking in the direction of source device 102 but does not intend to resume consuming content presented by source device 102.

Example System

Figure 2:
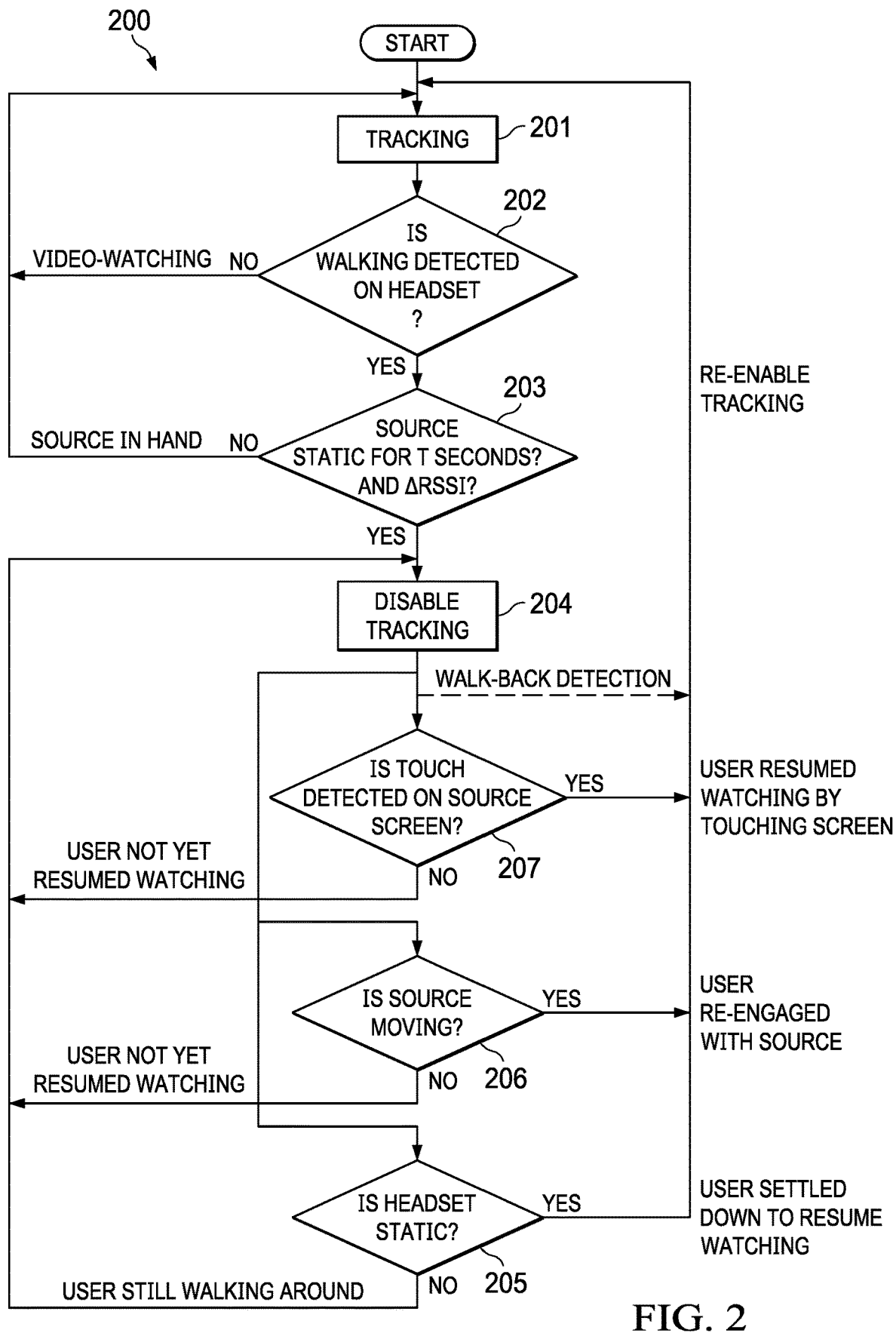
FIG. 2 is a flow diagram of a process for disabling/re-enabling head tracking for a spatial audio application, according to an embodiment.

FIG. 2 is a flow diagram of process 200 for disabling/re-enabling head tracking for a spatial audio application, according to an embodiment. Process 200 can be implemented using, for example, the sound source architecture 1000 shown in FIG. 10, the headset architecture 1100 shown in FIG. 11 or a combination of architectures 1000 and 1100. Each architecture includes a wireless transceiver (e.g., a Bluetooth chipset) that allows sensor data and other data to be communicated between headset 101 and source device 102.

Process 200 begins by enabling head tracking (201) to track the head of user 100. The head of user 100 can be tracked using one or more inertial sensors embedded in or coupled to headset 101. In an embodiment, inertial sensors embedded in headset 101 are used to track the head of user 100. Inertial sensors can include a 3-axis MEMS accelerometer configured to measure three-dimensional (3D) acceleration in a headset body frame and a 3-axis MEMS gyroscope configured to measure 3D rotation rate in the headset body frame. In other embodiments, a camera of source device 102 can be used to determine a reference frame for the face of user 100, which can be provided to a head tracking algorithm to remove tracking error (e.g., an extended Kalman filter). In other embodiments, the camera or a Bluetooth head tracker can be used for head tracking instead of inertial sensors or in addition to inertial sensors. For example, a separate head tracker device can be attached to conventional headphones that do not include inertial sensors. The head tracker device includes inertial sensors and a Bluetooth transceiver for communicating with source device 102. In an embodiment, inertial sensors in source device 102 are used in combination with inertial sensors in headset 101 to track the relative motion between headset 101 and source device 102.

Figure 3:
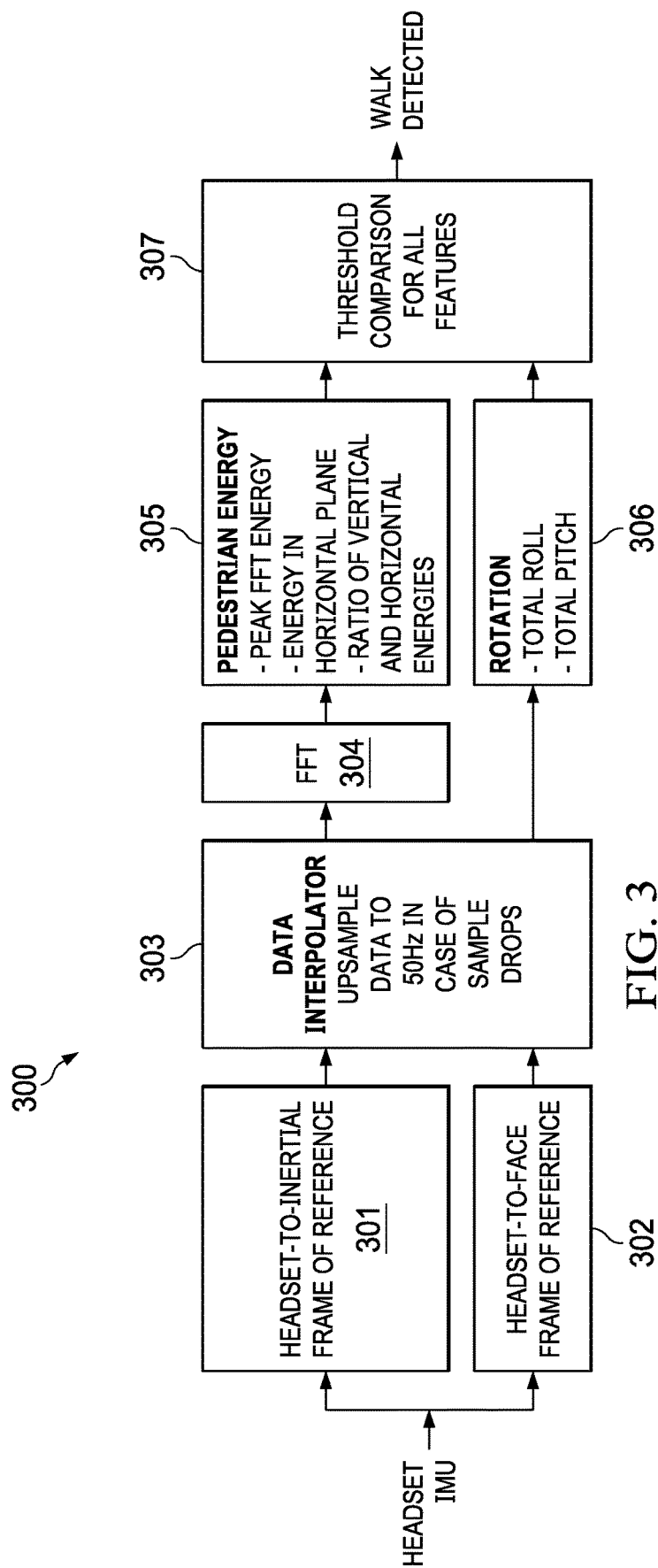
FIG. 3 is a block diagram of a walk detector, according to an embodiment.

Process 200 continues by detecting if user 100 is walking (202), as described in reference to FIG. 3. If walking is not detected, process 200 assumes that user 100 is still consuming content on source device 102 and head tracking remains enabled (201). If walking is detected, process 200 determines if source device 102 is static for a specified time period T (203). The static period of source device 102 needs to overlap or coincide with the walking period detected on headset 101. If source device 102 is not static for the specified time period T, process 200 assumes user 100 has source device 102 in hand and head tracking remains enabled (201). If walking is detected and source device 102 is static for the time period T, it is assumed user 100 has walked away from source device 102 and head tracking is disabled (204).

In an alternative embodiment, in addition to checking whether source device 102 is static (203), process 200 also checks a buffer of RSSI values received over a specified time window to determine if the RSSI values (e.g., by averaging the RSSI values in a buffer) have changed by more than a specified threshold. For example, if the RSSI values have dropped below a specified threshold level, then process 200 assumes that headset 101 has moved further from source device 102, as described in reference to FIGS. 8A and 8B. Thus, if walking is detected (202), source device 102 is static and the RSSI values have dropped below the specified threshold level (203), process 200 assumes that the user has walked away from source device 102, and head tracking is disabled (204). Otherwise, head tracking remains enabled (201).

An advantage of the head tracking described above is that two or three tests are applied to confirm that the user has walked away to avoid false positives that could occur if only one of the three tests were used to determine whether to disable head tracking. For example, user 100 could walk away from table 103 with source device 102 in hand so that she can continue to watch a video while walking. In this example, the additional condition of checking that source device 102 is static would prevent disabling of head tracking, which would adversely affect the spatial audio perceived by user 100. In another example, the user could walk away from source device 102 for only a short distance (e.g., to reach for an object, shut a door, etc.) but then quickly return to source device 102 to continue watching the video.

In this example scenario because walking is detected and source device 102 is static, head tracking would be disabled. By also checking the RSSI values, process 200 can determine that the user has walked beyond a specified distance threshold (e.g., 4 meters) associated with the lower RSSI values (e.g., −70 dB), as described in reference to FIG. 8B. This longer distance, if exceeded, provides an additional confirmation that user 100 does not intend to resume consuming content on source device 102, and thus head tracking will remain disabled. Note that using RSSI monitoring by itself would be insufficient at least because attenuation of the received RF signal could occur for other reasons, such as user 100 turning her head or multipath interference. For example, a wireless transceiver in headset 101 may be on either the right or left side of the head of user 100 but not both. If use 100 turns her head 90 degrees, the wireless signal would be occluded by the her head, resulting in a drop in RSSI values (e.g., −15 dB). Also, note that the specified distance threshold can be set to account for the user's head turning to reduce false positives.

In addition to determining whether to disable head tracking, process 200 also determines when to re-enable head tracking. After head tracking is disabled, process 200 determines if headset 101 is static (205), determines if source device is moving (206) and determines if a touch input is detected on a touch screen of source device (207). If any of the foregoing conditions is met, process 200 re-enables head tracking. For example, if headset 101 is determined to be static, process 200 assumes that user 100 has settled down to resume consuming content and head tracking is re-enabled. If source device 102 is determined to be moving, process 200 assumes that user 100 has re-engaged with source device 102 and head tracking is re-enabled. If touch input is detected, process 200 assumes that user 100 has resumed consuming content by touching the screen of source device 102. If source device 102 does not have a touch screen, then other signals can be used to detect the user's physical interaction with source device 102, such as vibration measured by accelerometers, gyros, proximity sensors, optical sensors, touch surfaces, etc.

Example Walk Detection System

FIG. 3 is a block diagram of walk detector 300, according to an embodiment. Walk detector 300 leverages the insight that periodic vertical oscillations from a foot-strike at each step and side sway from step to step can be observed with high signal-to-noise ratio (SNR) on a headset inertial measurement unit (IMU). Its application to spatial audio applications is that as user 101 walks away from source device 102, she loses her visual anchor to source device 102, which is streaming content. The visual discordance is mitigated by detecting user 100 has walked away from source device 102 and subsequently disabling head tracking.

In an embodiment, the headset IMU 1111 (see FIG. 11) includes a 3-axis MEMS accelerometer for measuring 3D acceleration in a headset body frame, and a 3-axis MEMS gyroscope for measuring 3D rotation rates (e.g., yaw, pitch, roll rates) in a headset body frame. The 3D acceleration is transformed 301 into an inertial (world) reference frame using a headset-to-inertial coordinate transform (e.g., a direction cosine matrix, quaternion) constructed from roll, pitch and yaw angles derived by integrating the row, pitch and yaw rotation rates. The 3D rotation rates are transformed 302 into a face reference frame using a headset-to-face transform derived from a face detection algorithm that operates on images captured by a camera embedded in or coupled to source device 102. The inertial reference frame is suitable to observe vertical oscillations during walking. The face reference frame is suitable to observe head roll, pitch and yaw, which can be used to suppress false positives, as described in reference to FIG. 2.

The vertical acceleration in the inertial reference frame and the rotation rates in the face reference frame are input into data interpolator 303. Data interpolator 303 is used when acceleration and/or rotation rate data is missing due to environmental factors, such as WiFi drop out. Data interpolator 303 buffers the acceleration and rotation rate data over a specified time window and then applies upsampling to the buffered data, as described more fully in reference to FIGS. 4 and 5.

The interpolated vertical acceleration data is input into a frequency transform 304, such as Fast Fourier Transform (FFT), which generates a frequency spectrum for the vertical acceleration. Pedestrian energy analyzer 305 the analyzes the frequency spectrum for features that are indicative of walking. The features are extracted from the frequency spectrum and compared to threshold values to determine if the vertical acceleration is indicative of walking. Additionally, total roll and pitch angles output by data interpolator 303 are compared against expected ranges for walking. Based on the comparison of features to the threshold values and the roll and pitch angles falling within expected ranges for walking, a walk detection signal is generated which is used by system 200 as previously described. In an embodiment, the following logic is applied to a portion of the frequency spectrum for walking (0.3-0.4 Hz):

| | |
|---|---|
| isWalking = | pedEnergyZPeak > E1 && |
| | pedEnergyZByXY > E2 && |
| | pedEnergyPlane > E3 && |
| | (A <= thetaRollFaceDeg <= B) && |
| | (C <= thetaPitchFaceDeg <= D). |

In the logic above "isWalking" is the walk detection signal (e.g., Boolean value if TRUE or FALSE), "pedEnergyZPeak" is peak energy in the frequency Spectrum (i.e., max(fft(AccelZ))), "pedEnergyZByXY" is a ratio of vertical and horizontal energies, given by pedEnergyZ/(pedEnergyPlane+eps), "pedEnergyPlane" is the energy in the inertial X-Y plane, "thetaRollFaceDeg" is the total roll angle in the face reference frame (in degrees), "thetaPitchFaceDeg" is the total pitch angle in the face reference frame (in degrees) and "eps" is a small value to avoid a divide by zero condition when computing pedEnergyPlane. If all of the conditions are TRUE, then isWalking=TRUE; otherwise isWalking=FALSE. In an embodiment, E1=0.25, E2=0.4 and E3=1.8.

In an embodiment, the total roll and pitch angles "thetaRollFaceDeg" and "thetaPitchFaceDeg" in the face reference frame are computed by integrating the roll and pitch rotation rates in the face reference frame, respectively, as follows:

$$\theta_{face} = \Sigma(|\omega_{face}| \cdot dt).$$

In an embodiment, A=5, B=120, C=5 and D=80 degrees. If the total roll and total pitch angles are outside these ranges it is assumed the user is not looking at the screen of source device 102.

Figure 4:
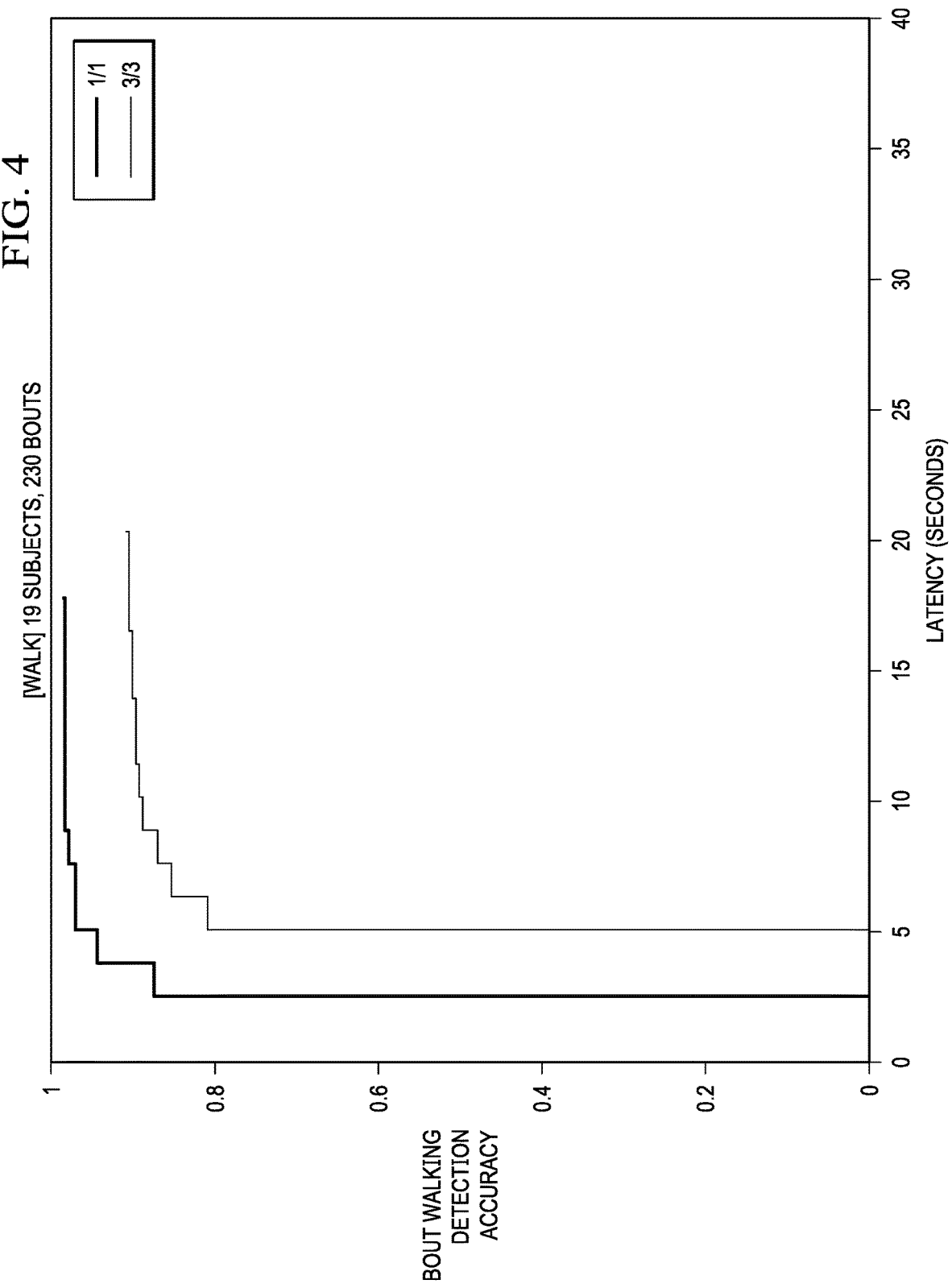
FIG. 4 is a plot of walking detection accuracy versus latency, according to an embodiment.

In an embodiment, an "isWalking" decision is computed every N seconds with a M % overlap window (e.g., 50%). In an embodiment, K consecutive walk calls are required to disable head tracking. FIG. 4 is a plot of walking detection accuracy versus latency. As can be observed from FIG. 4, there is a minimum latency of about 5.12 seconds by requiring K=3 consecutive walk calls, where each isWalking decision is computed about every 2.56 seconds.

Example Data Interpolation

As previously stated, for a variety of reasons there may be missing samples of acceleration and rotation rate provided by the headset IMU 1111. If walking detection is performed on source device 102, then the headset IMU sensor data (accelerations, rotation rates in headset body frame) are transmitted to the wireless transceiver of source device 102 over a wireless communication channel, such as a Bluetooth communication channel. In some cases, packets of the sensor data are lost during transmission due to, for example, the coexistence of Bluetooth and WiFi which may overlap in operational bands. In an embodiment, this data loss is addressed using data interpolator 303. Studies have shown that walking is not properly detected for measurement epochs that contain sensor data drops or for data rates less than 50 Hz. Accordingly, data interpolator 303 checks for each of these conditions.

Figure 5:
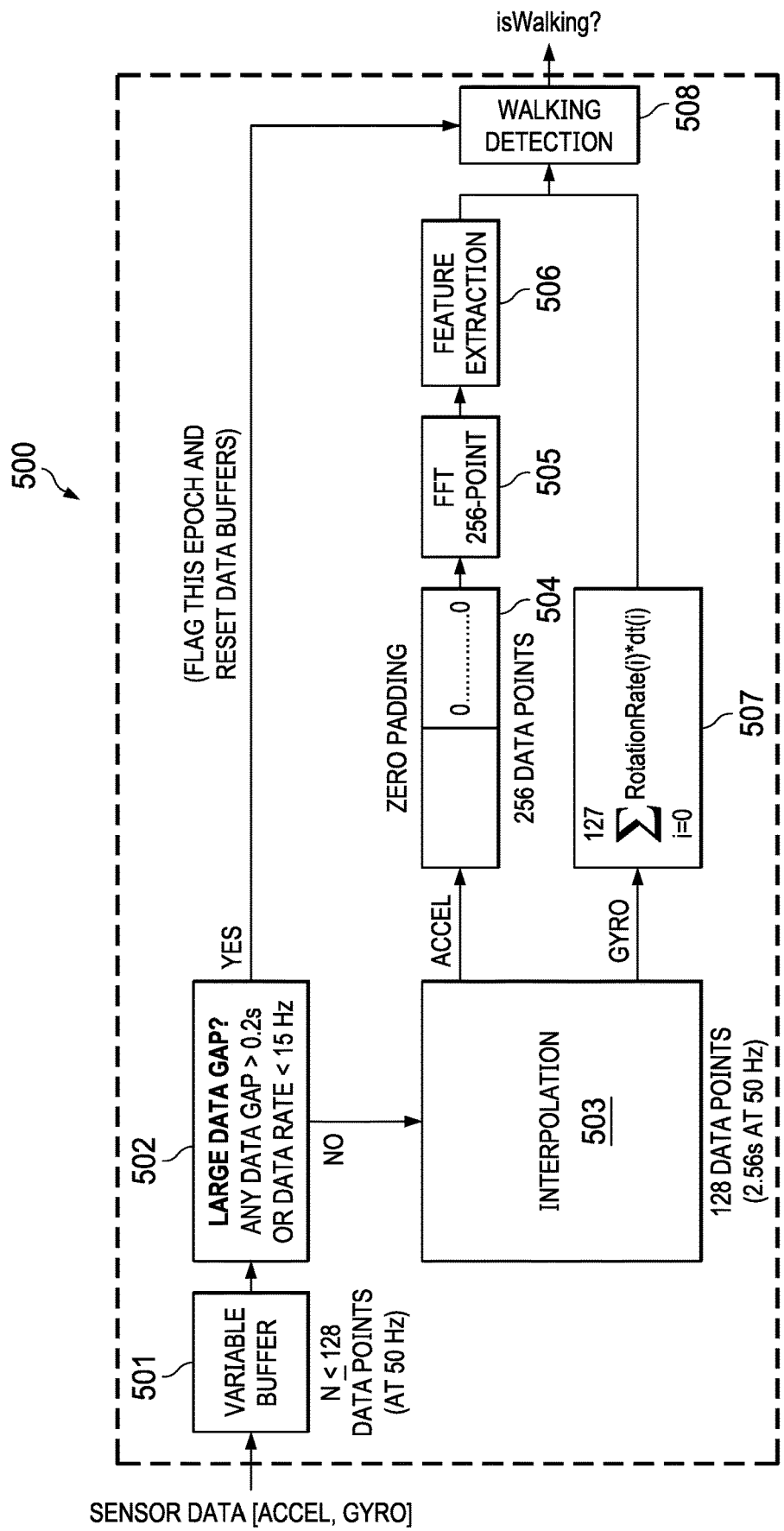
FIG. 5 is a block diagram of a system for handling missing data samples, according to an embodiment.

FIG. 5 is a block diagram of data interpolator 303 for handling missing data samples, according to an embodiment. For each measurement epoch (e.g., every 0.2 seconds or 50 Hz). Data interpolator 303 stores samples of vertical acceleration in the inertial reference frame and roll, pitch and yaw angles in the face reference frame provided by the acceleration and rotation rate sensors for each measurement epoch. In an embodiment, interpolation is applied when the number of samples stored in variable buffer 501 is less than N (e.g., N<128 samples @ 50 Hz).

Data gap analyzer 502 detects data gaps in the buffered sensor data that are greater than X seconds (e.g., dataGap >0.2s) or data rates less than Y Hz (e.g., dataRate <15 Hz). If data Gap meets at least one of these conditions, then the measurement epoch is flagged and variable buffer 501 is reset. The flag is sent to walk detector 300, so that walk detector 300 does not use the measurement epoch to determine "isWalking" and waits for the next measurement epoch.

If the conditions above (dataGap <=0.2s and dataRate >=15 Hz) are met, interpolator 503 (e.g., Lagrange interpolation) is applied to the data samples stored in variable buffer 501. In embodiment, the interpolated inertial acceleration data is zero padded 505 and transformed 505 into a frequency domain. In an embodiment, a 256-point FFT is used to generate the frequency spectrum of the interpolated inertial vertical acceleration data and inertial horizontal acceleration data (acceleration in XY-plane). Feature extractor 506 then extracts the features "pedEnergyZ" and "pedEnergyPlane" from their respective frequency spectrums in the pedestrian frequency band (0.3-4.0 Hz) for use in the walk detection logic described above for setting the "isWalking" flag. Data interpolator 303 also integrates the buffered roll and pitch rotation rates to get "thetaRollFaceDeg" and "thetaPitchFaceDeg," respectively, for use in the walk detection logic described above for setting the "isWalking" flag.

Figure 6:
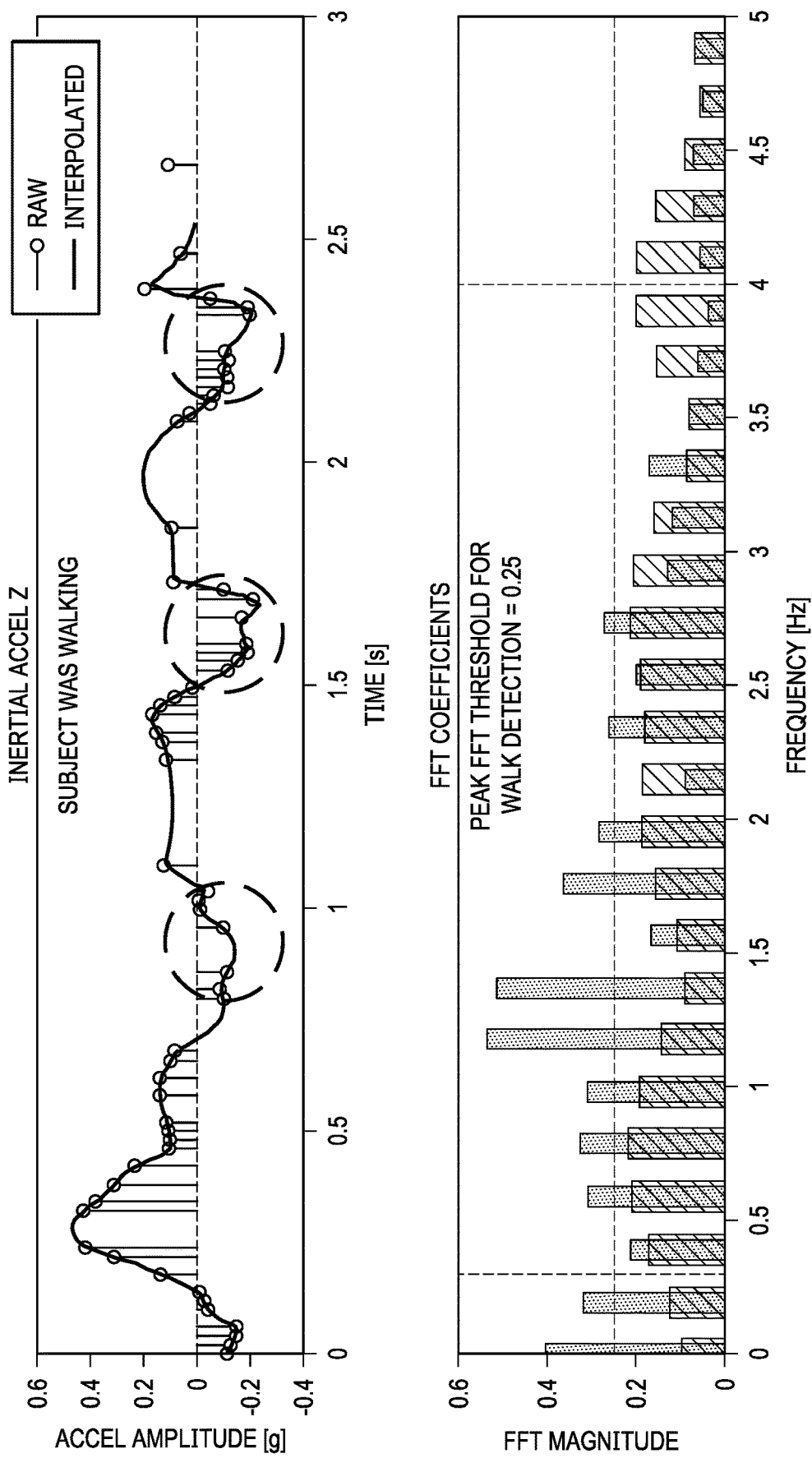
FIG. 6 is illustrates the use of extracted features in the frequency spectrum of the inertial vertical acceleration, according to an embodiment.

FIG. 6 is illustrates the use of extracted features in the frequency spectrum of the inertial vertical acceleration, according to an embodiment. The top plot is the time domain inertial vertical acceleration amplitude (g) include both raw and interpolated samples. The circled regions indicate footstrikes. The bottom plot is the FFT magnitude of the inertial vertical acceleration, showing the peak energy "pedEnergyZPeak" exceeding the peak energy threshold value (0.25) in the pedestrian frequency range of 0.3-4.0 Hz.

Figure 7:
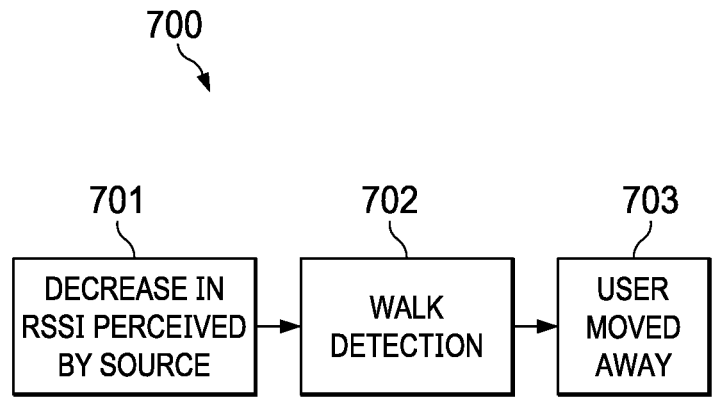
FIG. 7 is a system for disabling head tracking based on received signal strengths, according to an embodiment.

FIG. 7 is a flow diagram of process 700 for disabling head tracking based on RSSI values, according to an embodiment. One of the challenges of relative head tracking is detecting distracted viewing where user 100 turns her head away from source device 102 or walks away from source device 102. Distracted viewing can be identified by detecting a persistent decrease in RSSI values perceived by source device (701) and also detecting that the user is walking (702), as described in reference to FIG. 3. If the RSSI values are persistently decreasing while the user is walking, then the system assumes that the user has walked away from the source device (703). In an embodiment, the RSSI values can be computed by a wireless transceiver of the source device.

Figure 8A:
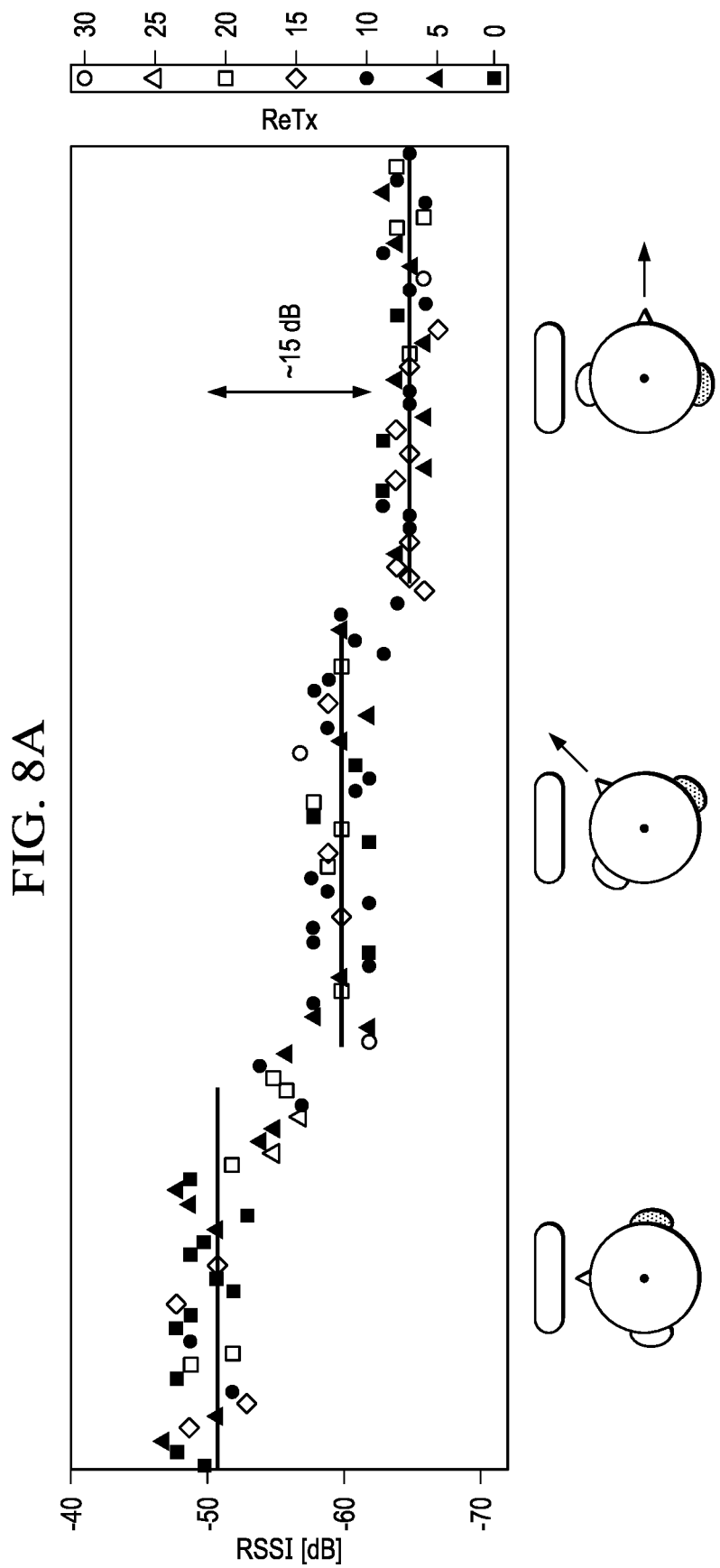
FIG. 8A illustrates the change in received signal strength indicators for different head poses, according to an embodiment.

FIG. 8A illustrates the change in received signal strength indicators for different head poses, according to an embodiment. In this example scenario, it is assumed wireless transceiver 800 is on the right side of the user's head. As shown, the RSSI values decrease as the user turns her head to the right, in this example going from −50 dB to −60 dB and then −65 dB when the head of user 100 is at 90 degrees from the forward-facing direction. This decrease in RSSI values is due to the fact that the line-of-sight of the wireless signal transmitted by source device 102 is occluded by the head of user 100 as it turns.

Figure 8B:
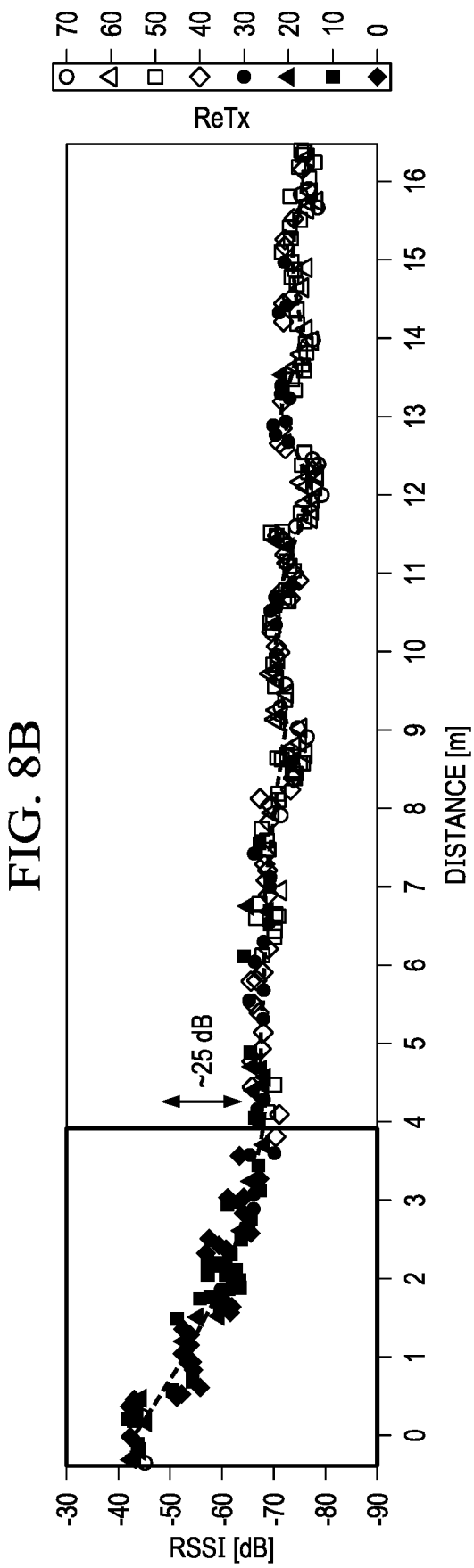
FIG. 8B illustrates how the received signal strength indicators are inversely proportional to distance, according to an embodiment.

FIG. 8B illustrates how the received signal strength indicators are inversely proportional to distance, according to an embodiment. As shown in this example, a decrease in RSSI values can be associated with a distance from source device 102. This allows an RSSI threshold to be set for a desired distance from source device 102, which in this example is about 4 meters. Any suitable threshold distance can be used. In this example, a distance of 4 meters is assumed to be a good indicator that the user intends to walk away from source device 102. Note that the process described above references RSSI values. However, any metric for measuring received signal strength can be used.

Figure 9:
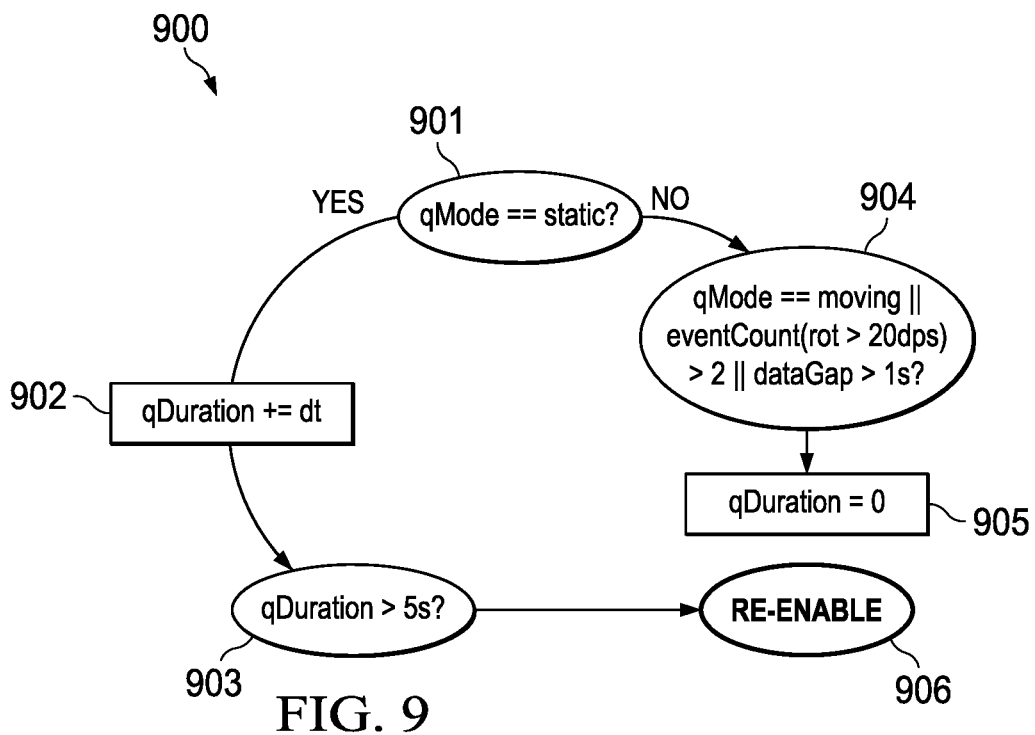
FIG. 9 illustrates a finite state machine (FSM) for re-enabling head tracking based on headset quiescence, according to an embodiment.

FIG. 9 illustrates a finite state machine (FSM) for re-enabling head tracking based on headset quiescence, according to an embodiment. In spatial audio applications, after user 100 walks back to source device 102, picks up source device 102 to resume consuming content, or returns to a previous position (e.g., sitting position) to resume consuming content, it is desired to re-enable head tracking that has been previously disabled as described above.

As previously discussed with respect to FIG. 2, when tracking is disabled due to detection of distracted viewing (e.g., walking away, turning head), head tracking is automatically re-enabled by detecting that source device 102 has been picked-up, detecting extended headset quiescence or detecting touch input on a source device touch screen or touch surface, or other signal that indicates the user's physical interaction with the device (e.g., pressing a button or key, proximity sensor, optical sensor, infrared sensor, time of flight (TOF) sensor).

In an embodiment, a finite state machine (FSM) can be implemented on headset 101 and/or source device 102 as shown in FIG. 9. Headset 101 sets a quiescent mode flag (qMode) as static or not static (or semi-static). For example, qMode can be set to STATIC when in quiescent mode (i.e., static headset). After qMode is set to STATIC, a timer (qDuration) is incremented until the timer exceeds a specified value (e.g., 5 seconds), after which point head tracking is re-enabled.

If qMode changes from static to not static or semi-static while qDuration is incrementing than logic is tested to reset qDuration when the headset is moving, rotating or if a data gap (dataGap) is detected. This logic can be represented as follows:

qMode=moving||eventCount(rot >x dps)
>y||dataGap>z sec, where moving indicates that motion has been sensed by the headset IMU 1111, eventCount is a counter that counts y rotation events (e.g., 2 rotation events) that exceed x degrees per second (dps) (e.g., 20 dps), dataGap is determined as described in reference to FIGS. 4 and 5, and z is the size of dataGap (e.g., 1 sec). If the condition above is true, qDuration is reset to zero.

In some embodiments, using the IMU and other sensors in headset 101, may be combined with other mobile devices on the user's person (e.g., a smart watch) that include inertial or other sensors to detect transitions of a user from sit-to-stand and vise-versa. The former can serve as more reliable prior event to the distracted viewing detection described above (e.g., the user stood up from consuming content while sitting), and the latter can be used to aid more reliable detection of re-enabling (e.g., the user has walked back and sat down again to watch).

Example Software/Hardware Architectures

Figure 10:
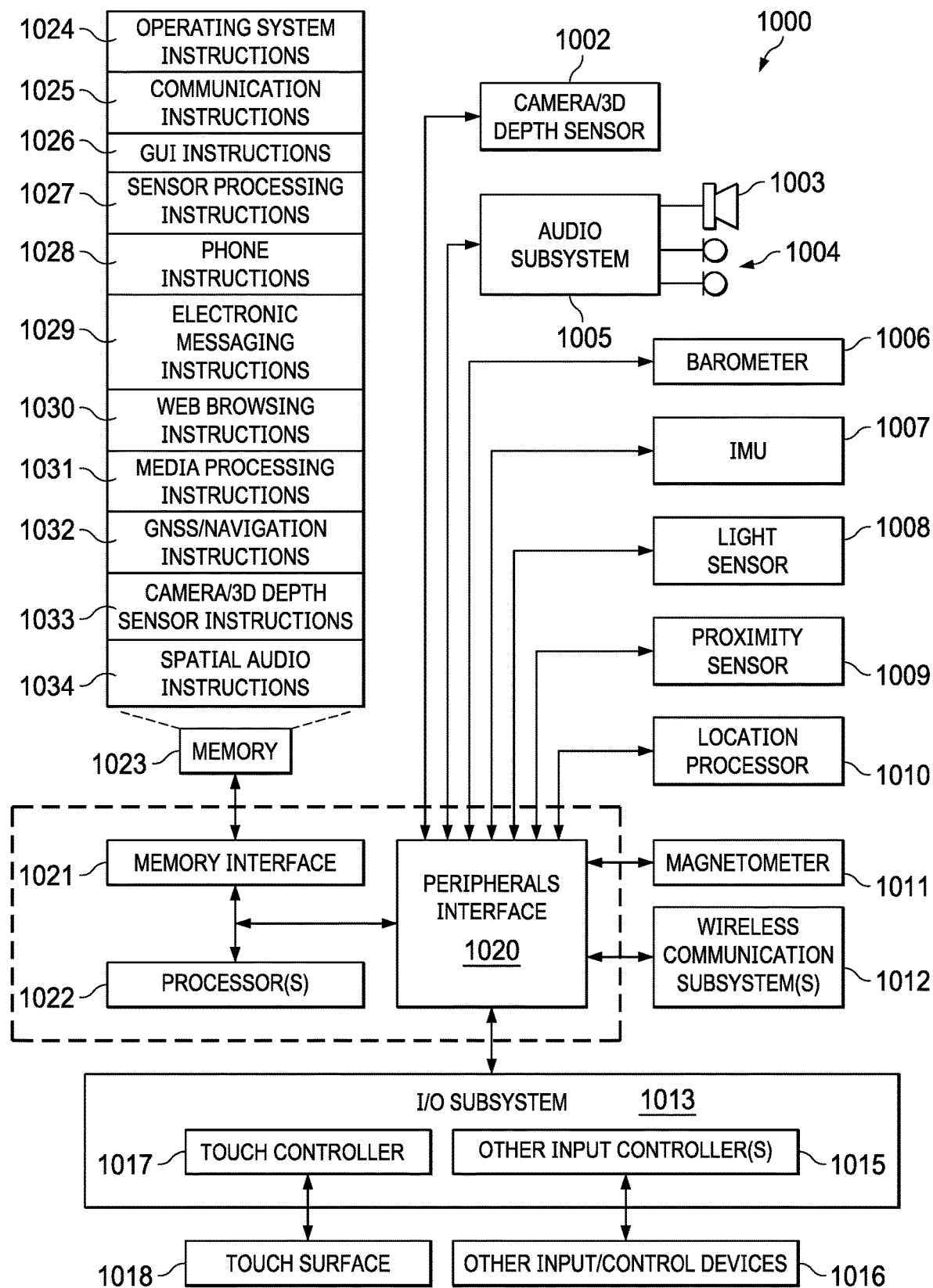
FIG. 10 a block diagram of source device architecture implementing the features and operations described in reference to FIGS. 1-9.

FIG. 10 is a conceptual block diagram of source device software/hardware architecture 1000 implementing the features and operations described in reference to FIGS. 1-10. Architecture 1000 can include memory interface 1021, one or more data processors, digital signal processors (DSPs), image processors and/or central processing units (CPUs) 1022 and peripherals interface 1020. Memory interface 1023, one or more processors 1022 and/or peripherals interface 1020 can be separate components or can be integrated in one or more integrated circuits.

Sensors, devices and subsystems can be coupled to peripherals interface 1020 to provide multiple functionalities. For example, IMU 1007, light sensor 1008 and proximity sensor 1009 can be coupled to peripherals interface 1020 to facilitate motion sensing (e.g., acceleration, rotation rates), lighting and proximity functions of the wearable computer. Location processor 1010 can be connected to peripherals interface 1020 to provide geo-positioning. In some implementations, location processor 1010 can be a GNSS receiver, such as the Global Positioning System (GPS) receiver. Electronic magnetometer 1011 (e.g., an integrated circuit chip) can also be connected to peripherals interface 1020 to provide data that can be used to determine the direction of magnetic North. Electronic magnetometer 1011 can provide data to an electronic compass application. IMU 1007 can be an IMU that includes one or more accelerometers and/or gyros (e.g., 3-axis MEMS accelerometer and 3-axis MEMS gyro) configured to determine change of speed and direction of movement of the source device. Barometer 1006 can be configured to measure atmospheric pressure around the mobile device.

Camera/3D depth sensor 1002 captures digital images and video and can include both front-facing and rear-facing cameras. The 3D depth sensor can be any sensor capable of capturing 3D data or point clouds, such as a time of flight (TOF) sensor or LiDAR.

Communication functions can be facilitated through wireless communication subsystems 1012, which can include radio frequency (RF) receivers and transmitters (or transceivers) and/or optical (e.g., infrared) receivers and transmitters. The specific design and implementation of the wireless communication subsystem 1024 can depend on the communication network(s) over which a mobile device is intended to operate. For example, architecture 1000 can include communication subsystems 1024 designed to operate over a GSM network, a GPRS network, an EDGE network, a Wi-Fi™ network and a Bluetooth™ network. In particular, the wireless communication subsystems 1024 can include hosting protocols, such that the mobile device can be configured as a base station for other wireless devices.

Audio subsystem 1005 can be coupled to a speaker 1003 and one or more microphones 1004 to facilitate voice-enabled functions, such as voice recognition, voice replication, digital recording and telephony functions. Audio subsystem 1005 can be configured to receive voice commands from the user.

I/O subsystem 1013 can include touch surface controller 1017 and/or other input controller(s) 1015. Touch surface controller 1017 can be coupled to a touch surface 1018. Touch surface 1018 and touch surface controller 1017 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1046. Touch surface 1018 can include, for example, a touch screen or the digital crown of a smart watch. I/O subsystem 1013 can include a haptic engine or device for providing haptic feedback (e.g., vibration) in response to commands from processor or a digital signal processor (DSP) 1022. In an embodiment, touch surface 1018 can be a pressure-sensitive surface.

Other input controller(s) 1015 can be coupled to other input/control devices 1016, such as one or more buttons, rocker switches, thumb-wheel, infrared port and USB port. The one or more buttons (not shown) can include an up/down button for volume control of speaker 1003 and/or microphones 1004. Touch surface 1018 or other input control devices 1016 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1018; and a pressing of the button for a second duration that is longer than the first duration may turn power to the mobile device on or off. The user may be able to customize a functionality of one or more of the buttons. The touch surface 1018 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 1021 can be coupled to memory 1023. Memory 1023 can include high-speed random access memory and/or non-volatile memory, such as one or more magnetic disk storage devices, one or more optical storage devices and/or flash memory (e.g., NAND, NOR). Memory 1023 can store operating system 1024, such as the iOS operating system developed by Apple Inc. of Cupertino, Calif. Operating system 1024 may include instructions for handling basic system services and for performing hardware dependent tasks. In some implementations, operating system 1024 can include a kernel (e.g., UNIX kernel).

Memory 1023 may also store communication instructions 1025 to facilitate communicating with one or more additional devices, one or more computers and/or one or more servers, such as, for example, instructions for implementing a software stack for wired or wireless communications with other devices. Memory 1023 may include graphical user interface instructions 1026 to facilitate graphic user interface processing; sensor processing instructions 1027 to facilitate sensor-related processing and functions; phone instructions 1028 to facilitate phone-related processes and functions; electronic messaging instructions 1029 to facilitate electronic-messaging related processes and functions; web browsing instructions 1030 to facilitate web browsing-related processes and functions; media processing instructions 1031 to facilitate media processing-related processes and functions; GNSS/Location instructions 1032 to facilitate generic GNSS and location-related processes; and camera/3D depth sensor instructions 1033 for capturing images (e.g., video, still images) and depth data (e.g., a point cloud). Memory 1023 further includes spatial audio instructions 1034 for use in spatial audio applications, including but not limited AR and immersive video applications. Instructions 1034 include head tracking instructions and implements the user pose change detection features and processes, described in reference to FIGS. 1-9.

Each of the above identified instructions and applications can correspond to a set of instructions for performing one or more functions described above. These instructions need not be implemented as separate software programs, procedures, or modules. Memory 1023 can include additional instructions or fewer instructions. Furthermore, various functions of the mobile device may be implemented in hardware and/or in software, including in one or more signal processing and/or application specific integrated circuits.

Figure 11:
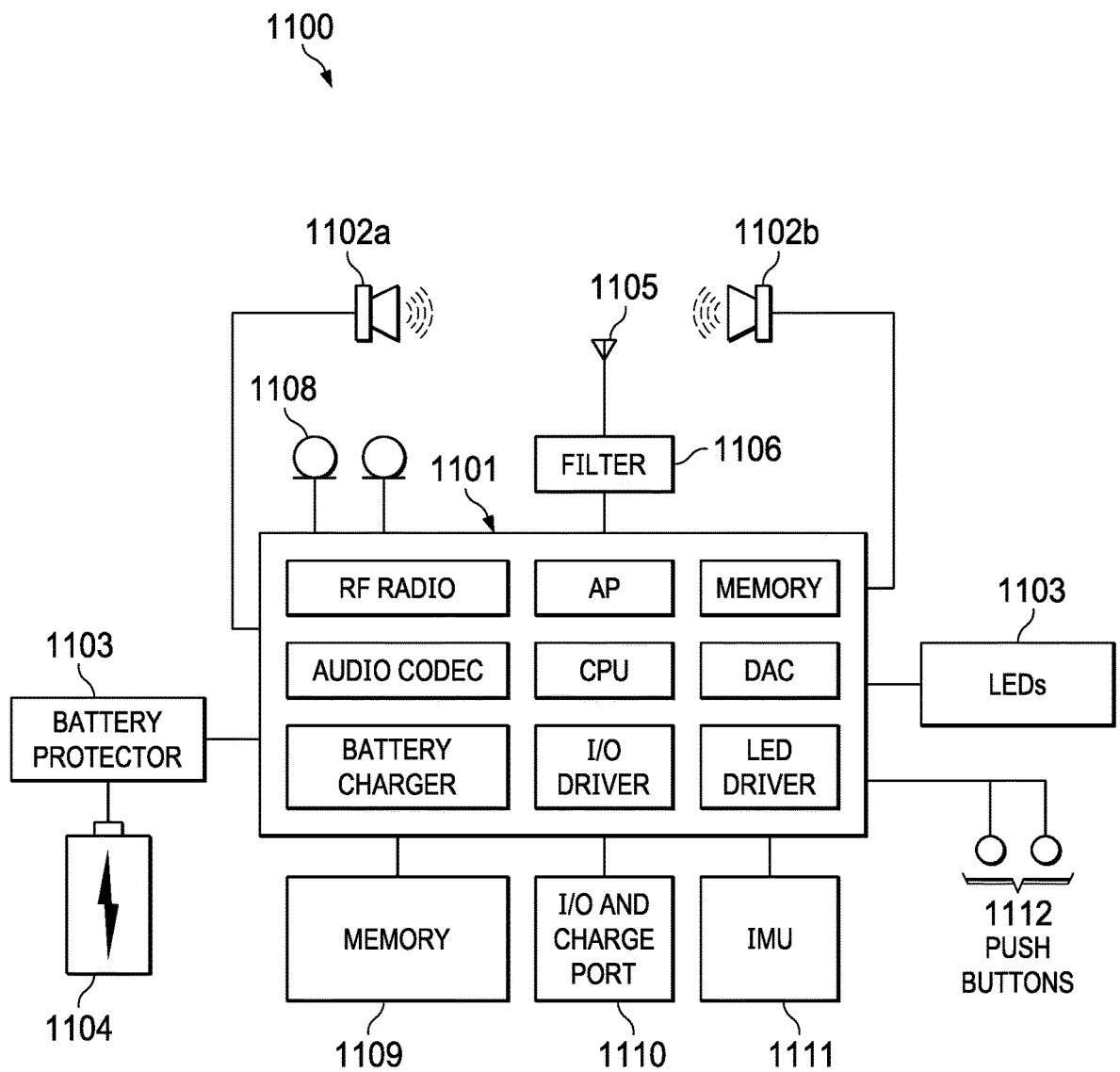
FIG. 11 a block diagram of headset architecture implementing the features and operations described in reference to FIGS. 1-9.

FIG. 11 is a conceptual block diagram of headset software/hardware architecture 1110 implementing the features and operations described in reference to FIGS. 1-9. In an embodiment, architecture 1100 can includes system-on-chip (SoC) 1101, stereo loudspeakers 1102a, 1102b (e.g., ear buds, headphones, ear phones), battery protector 1103, rechargeable battery 1104, antenna 1105, filter 1106, LEDs 1107, microphones 1108, memory 1109 (e.g., flash memory), PO/Charge port 1110, IMU 1111 and pushbuttons 1112 for turning the headset on and off, adjusting volume, muting, etc. IMU 1111 was previously described in reference to FIGS. 1-9, and includes, for example, a 3-axis MEMS gyro and a 3-axis MEMS accelerometer.

SoC 1101 further includes various modules, such as a radio frequency (RF) radio (wireless transceiver) for wireless bi-directional communication with other devices, such as a source device 103, as described in reference to FIGS. 1-9. SoC 1101 further includes an application processor (AP) for running specific applications, memory (e.g., flash memory), central processing unit (CPU) for managing various functions of the headsets, audio codec for encoding/decoding audio, battery charger for charging/recharging rechargeable battery 1104, I/O driver for driving I/O and charge port (e.g., a micro USB port), digital to analog converter (DAC) converting digital audio into analog audio and LED driver for driving LEDs 1107. Other embodiments can have more or fewer components.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   obtaining, using one or more processors of an auxiliary device worn by a user, motion data;
   tracking, using the one or more processors, the user's head based at least in part on the motion data;
   determining, using the one or more processors, whether or not the user is walking based at least in part on the motion data;
   in accordance with determining that the user is walking, determining if a source device configured to deliver spatial audio to the auxiliary device is static for a specified period of time; and
   in accordance with determining that the user is walking and the source device is static for the specified period of time, disabling the tracking of the user's head.

2. The method of claim 1, further comprising:
   receiving, using a wireless transceiver of the auxiliary device, a radio frequency signal from the source device;
   determining, using the one or more processors, that a strength of the radio frequency (RF) signal has decreased by a specified amount; and
   in accordance with determining that the user is walking, the source device is static for the specified period of time and the strength of the RF signal has decreased by a specified amount, disabling the head tracking.

3. The method of claim 2, wherein in the strength of the RF signal is indicated by a received signal strength indicator (RSSI) computed from the signal strength of the received RF signal.

4. The method of claim 1, wherein determining whether or not the user is walking based at least in part on the motion data, further comprises:
   converting the motion data into a frequency spectrum;

determining, based on one or more features of the frequency spectrum, whether or not a foot-strike has occurred that is indicative of walking;
determining a roll angle from the motion data in a face reference frame;
determining a pitch angle from the motion data in the face reference frame;
determining whether or not the roll angle and the pitch angle are within expected ranges for walking; and
in accordance with determining that the one or more features of the frequency spectrum indicate a foot-strike and side sway and the roll and pitch angles are within their expected ranges for walking,
determining that the user is walking.

5. The method of claim 3, wherein determining, based on one or more features of the frequency spectrum, whether not a foot-strike has occurred that is indicative of walking, further comprises:
converting the motion data into a vertical plane and a horizontal plane in an inertial reference frame;
computing a first frequency spectrum of the vertical motion;
computing a second frequency spectrum of the horizontal motion;
determining a peak energy in the first frequency spectrum;
determining a first portion of energy in the first frequency spectrum and a second portion of the energy in the second frequency spectrum; and
determining a presence of a foot-strike at each step of the user and side sway at each step to step based on the peak energy exceeding a specified threshold and a ratio of the first portion of energy and the second portion of energy.

6. The method of claim 4, further comprising:
determining that the motion data is missing samples; and
interpolating the motion data to generate additional motion data.

7. The method of claim 6, where the motion data includes acceleration data and rotation rate data, and interpolating the motion data to generate additional motion data, further comprises:
buffering a specified number of motion data samples in a buffer;
identifying a gap in the buffered motion data samples;
determining whether or not the gap is less than a specified amount of time or data rate;
in accordance with the gap being less than the specified amount of time or data rate, interpolating the buffered motion data samples to a higher number of motion data samples;
for acceleration data in the motion data samples, zero padding the acceleration data, generating a frequency spectrum from the zero padded acceleration data, extracting one or more features from the frequency spectrum that indicate a foot-strike or side sway, and determining that the user is walking based at least in part on the extracted one or more features; and
for rotation rate data in the motion data samples, integrating the rotation rate data over the higher number of rotation rate samples to obtain roll and pitch angles, and determining that the user is walking at least in part based on the roll and pitch angles being within an expected range for walking.

8. The method of claim 1, wherein determining whether or not the user is walking based at least in part on the motion data is computed every X seconds with an Y % overlap window, where X and Y are integers or real numbers greater than zero.

9. The method of claim 1, wherein N consecutive determinations that the user is walking are made before disabling the auxiliary device, where N is an integer greater than one.

10. The method of claim 1, further comprising:
obtaining, using the one or more processors, data from another auxiliary device worn by the user, transition data indicating a sit-to-stand transition or stand-to-sit transition; and
in accordance with determining that the user is walking, the source device is static for the specified period of time and the transition data, disabling the head tracking.

11. A method comprising:
disabling, using one or more processors of an auxiliary device worn by a user, head tracking for a spatial audio application, where a source device is presenting at least spatial audio content to the user through the auxiliary device;
detecting, using the one or more processors, a touch input on a display screen of the source device; or
determining, using the one or more processors, that the auxiliary device is static; or
determining, using the one or more processors, that the source device is moving; or
determining, using the one or more processors, that the user is walking back to the source device; and
in accordance with detecting touch input on the display screen of the source device or determining that the auxiliary device is static or that the source device is moving or the user is walking back to the source device, re-enabling, using the one or more processors, head tracking for the spatial audio application.

12. A system comprising:
one or more processors;
memory storing instructions that when executed by the one or more processors, cause the one or more processors to perform operations comprising:
obtaining motion data from an auxiliary device worn by a user;
tracking a user's head based at least in part on the motion data;
determining whether or not the user is walking based at least in part on the motion data;
in accordance with determining that the user is walking, determining if a source device configured to deliver spatial audio to the auxiliary device is static for a specified period of time; and
in accordance with determining that the user is walking and the source device is static for the specified period of time, disabling the tracking of the user's head.

13. The system of claim 12, further comprising:
receiving, using a wireless transceiver of the auxiliary, a radio frequency signal from the source device;
determining, using the one or more processors, that a strength of the radio frequency (RF) signal has decreased by a specified amount; and
in accordance with determining that the user is walking, the source device is static for the specified period of time and the strength of the RF signal has decreased by a specified amount, disabling the head tracking.

14. The system of claim 13, wherein in the strength of the RF signal is indicated by a received signal strength indicator (RSSI) computed from the signal strength of the received RF signal.

15. The system of claim 12, wherein determining whether or not the user is walking based at least in part on the motion data, further comprises:
converting the motion data into a frequency spectrum;
determining, based on one or more features of the frequency spectrum, whether or not a foot-strike has occurred that is indicative of walking;
determining a roll angle from the motion data in a face reference frame;
determining a pitch angle from the motion data in the face reference frame;
determining whether or not the roll angle and the pitch angle are within expected ranges for walking; and
in accordance with determining that the one or more features of the frequency spectrum indicate a foot-strike and side sway and the roll and pitch angles are within their expected ranges for walking,
determining that the user is walking.

16. The system of claim 15, wherein determining, based on one or more features of the frequency spectrum, whether not a foot-strike has occurred that is indicative of walking, further comprises:
converting the motion data into a vertical plane and a horizontal plane in an inertial reference frame;
computing a first frequency spectrum of the vertical motion;
computing a second frequency spectrum of the horizontal motion;
determining a peak energy in the first frequency spectrum;
determining a first portion of energy in the first frequency spectrum and a second portion of the energy in the second frequency spectrum; and
determining a presence of a foot-strike at each step of the user and side sway at each step to step based on the peak energy exceeding a specified threshold and a ratio of the first portion of energy and the second portion of energy.

17. The system of claim 16, further comprising:
determining that the motion data is missing samples; and
interpolating the motion data to generate additional motion data.

18. The system of claim 17, where the motion data includes acceleration data and rotation rate data, and interpolating the motion data to generate additional motion data, further comprises:
buffering a specified number of motion data samples in a buffer;
identifying a gap in the buffered motion data samples;
determining whether or not the gap is less than a specified amount of time or data rate;
in accordance with the gap being less than the specified amount of time or data rate, interpolating the buffered motion data samples to a higher number of motion data samples;
for acceleration data in the motion data samples, zero padding the acceleration data, generating a frequency spectrum from the zero padded acceleration data, extracting one or more features from the frequency spectrum that indicate a foot-strike or side sway, and determining that the user is walking based at least in part on the extracted one or more features; and
for rotation rate data in the motion data samples, integrating the rotation rate data over the higher number of rotation rate samples to obtain roll and pitch angles, and determining that the user is walking at least in part based on the roll and pitch angles being within an expected range for walking.

19. The system of claim 12, further comprising:
obtaining, using the one or more processors, data from another auxiliary device worn by the user, transition data indicating a sit-to-stand transition or stand-to-sit transition; and
in accordance with determining that the user is walking, the source device is static for the specified period of time and the transition data, disabling the head tracking.

20. A system comprising:
disabling, using one or more processors of an auxiliary device worn by a user, head tracking for a spatial audio application, where a source device is presenting at least spatial audio content to the user through the auxiliary device;
detecting, using the one or more processors, a touch input on a display screen of the source device; or
determining, using the one or more processors, that the auxiliary device is static; or
determining, using the one or more processors, that the source device is moving; or
determining, using the one or more processors, that the user is walking back to the source device; and
in accordance with detecting touch input on the display screen of the source device or determining that the auxiliary device is static or that the source device is moving or the user is walking back to the source device, re-enabling, using the one or more processors, head tracking for the spatial audio application.

* * * * *